Sept. 13, 1960 J. M. WILKALIS 2,952,560
BOTTLE LINING PROCESS AND APPARATUS
Filed Dec. 13, 1956 3 Sheets-Sheet 1
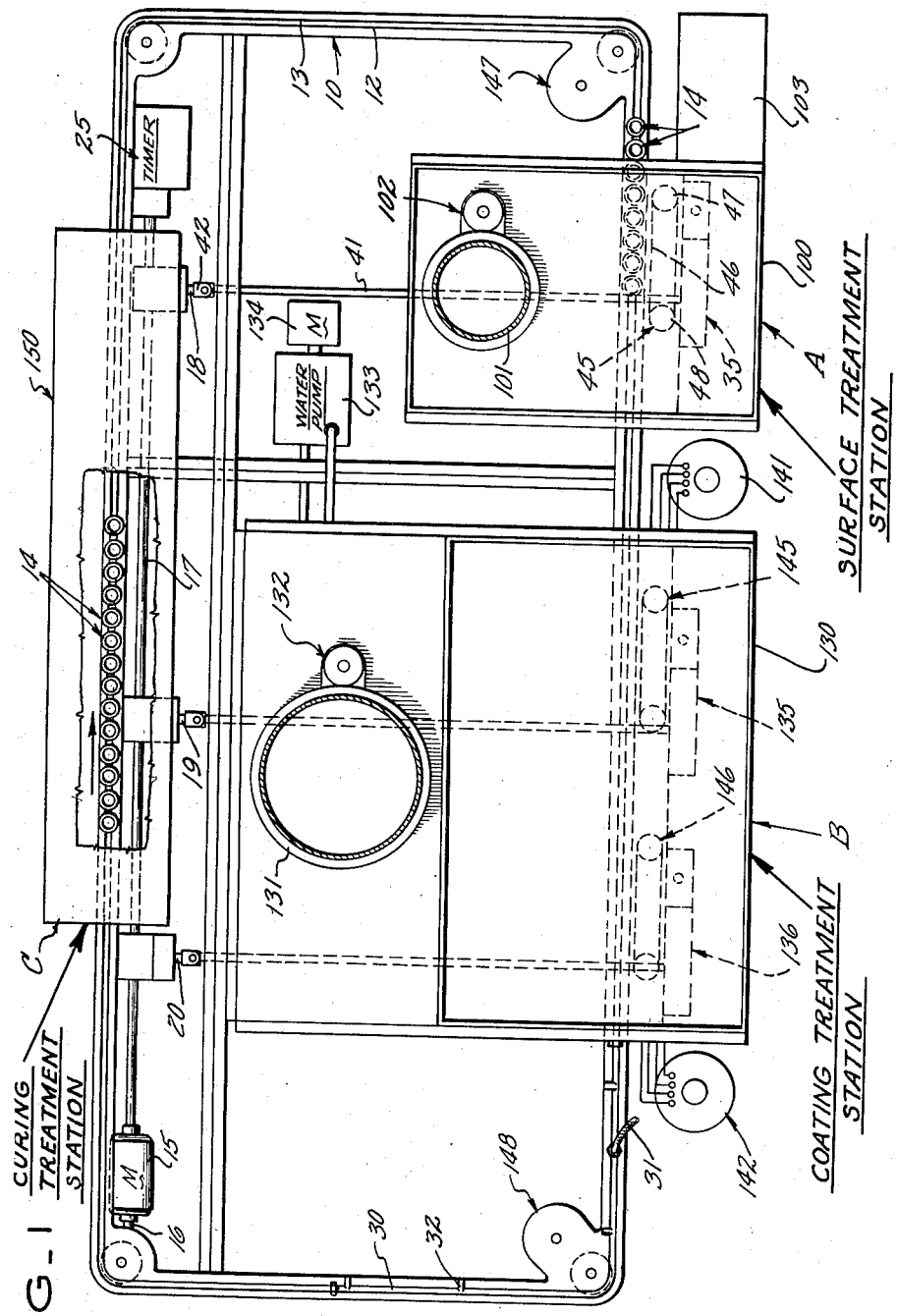
INVENTOR
JOSEPH M. WILKALIS
BY Bates & Willard
ATTORNEYS

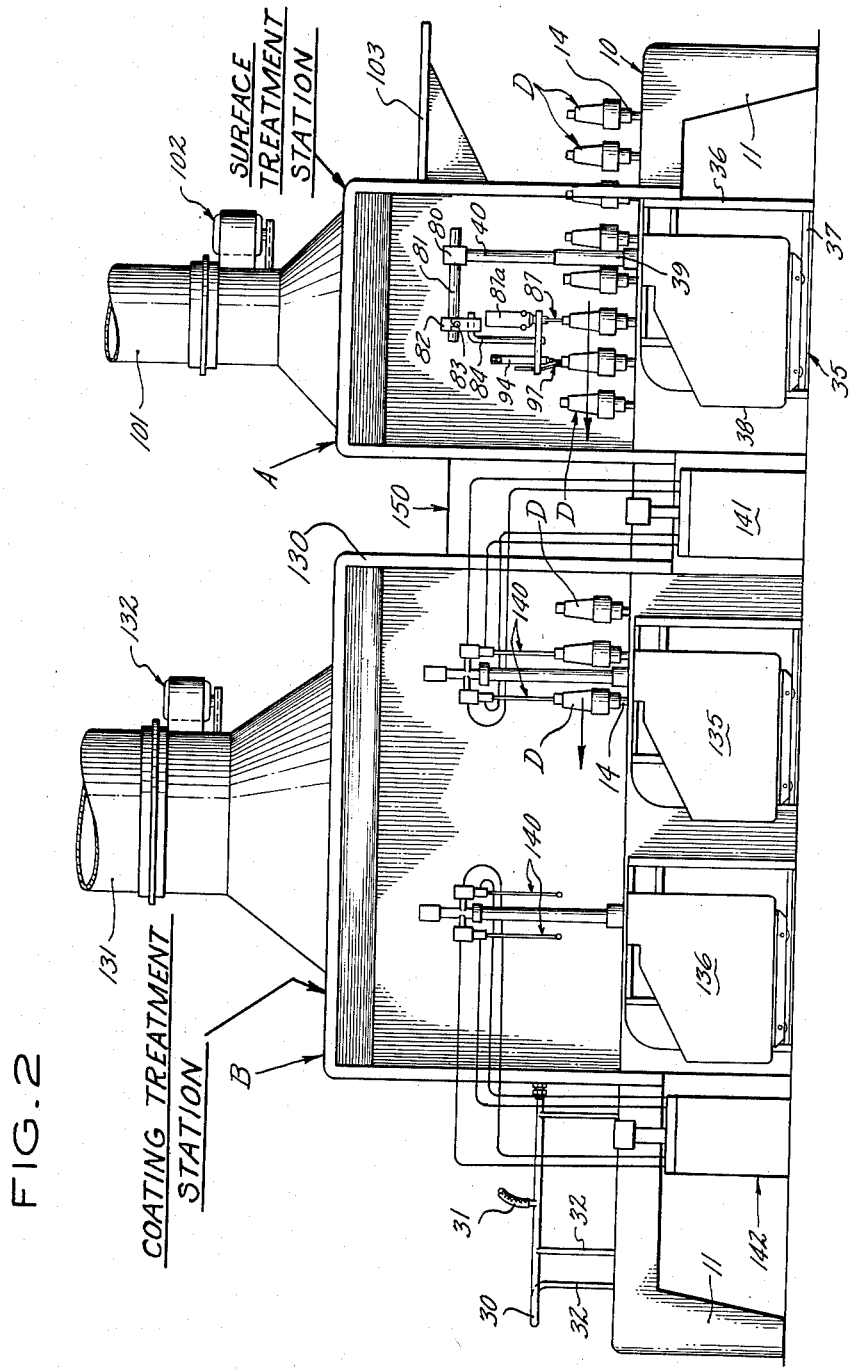

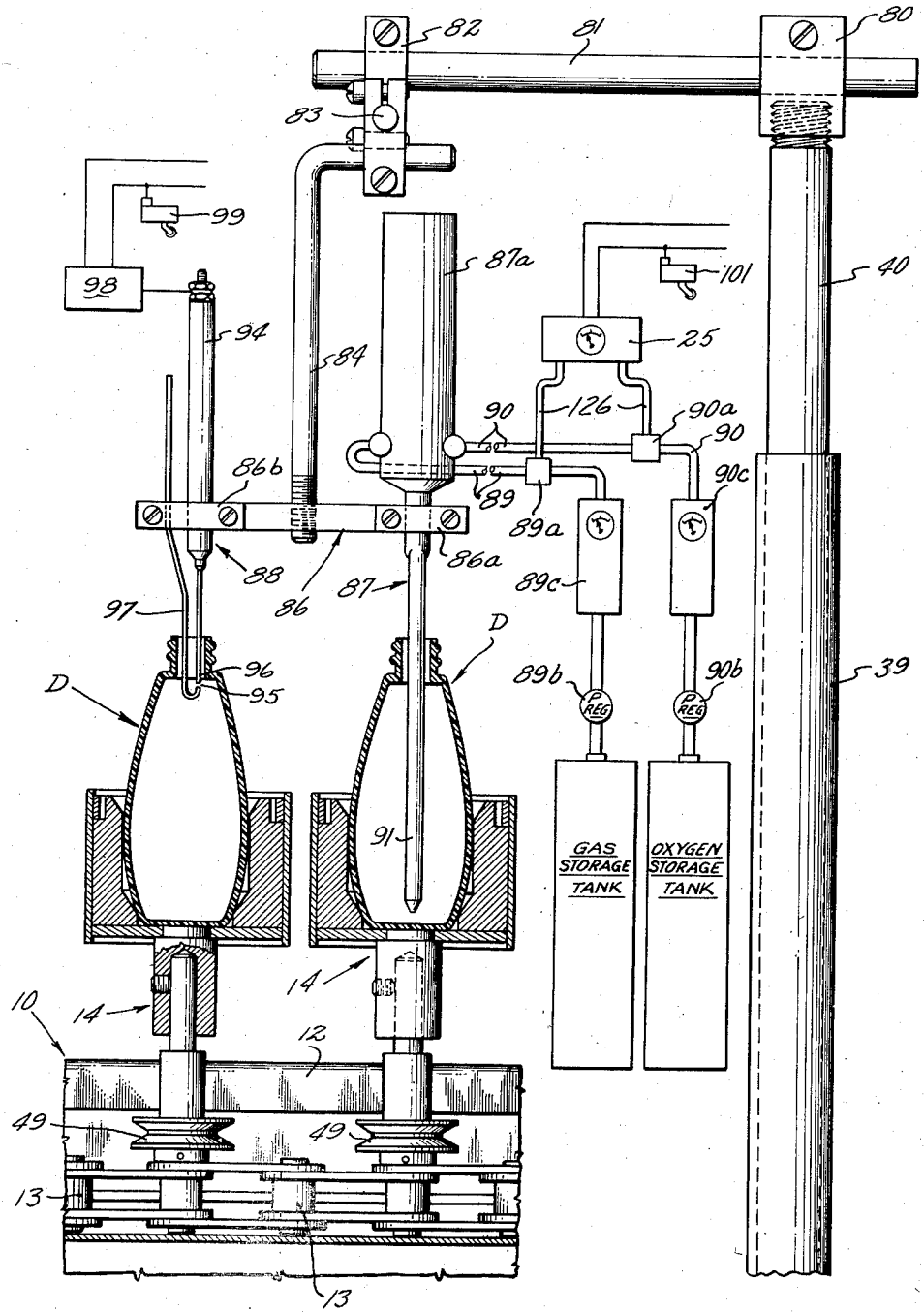

United States Patent Office 2,952,560
Patented Sept. 13, 1960

2,952,560
BOTTLE LINING PROCESS AND APPARATUS
Joseph M. Wilkalis, West Hartford, Conn., assignor to Plax Corporation, Bloomfield, Conn., a corporation of Delaware Filed Dec. 13, 1956, Ser. No. 628,068
9 Claims. (Cl. 117—46)

This invention relates generally to method and apparatus for treating the interior walls of synthetic resin containers and more specifically to modifying the interior walls of synthetic resin containers, such as polyethylene bottles, to provide a surface receptive to a coating applied thereto and to method and apparatus for applying a coating normally of a polymer synthetic resin to the so modified container walls.

Synthetic resin containers and bottles, as for example polyethylene bottles, have within the last few years been widely used in the packaging of various liquids, such as deodorants, hair preparations, cosmetic preparations, etc. Polyethylene has been, and is widely used in the production of squeeze bottles for the distribution of these liquid preparations in that it is relatively inert, has the desirable flexible properties necessary to function as a squeeze bottle, can be easily fabricated and is producible in quantity at a reasonable cost. Polyethylene is entirely satisfactory as a container for a wide variety of liquids. However, polyethylene is permeable to many organic liquids, including a large number of conventional organic solvents. Representative chemicals which permeate rapidly through polyethylene at room temperature include the straight chain hydrocarbons, the aromatic hydrocarbons, esters, ketones and various non-polar fluids. The high permeability characteristic of polyethylene to such liquids has naturally restricted the usage of polyethylene bottles to those products to which polyethylene is substantially impermeable. The permeable characteristic of polyethylene with respect to certain chemicals has resulted in the polyethylene bottle being rejected for use in industries where, due to its flexibility and ease of fabrication, it might otherwise be employed to advantage.

A proposal to line the polyethylene container to substantially diminish permeation encounters the problem of securing an effective bond of the lining to the container walls. The difficulty of securing adherence of other materials to polyethylene has made it extremely difficult to obtain a lasting coating of film-forming materials, other than polyethylene, on articles made of polyethylene or to effect a satisfactory bonding with the surface of an article made of a material other than polyethylene. This difficulty holds true whether the element to be applied to the polyethylene is to be built up as a coating by deposition from a solution, from a molten or liquid condition, or where both the polyethylene and the lining are performed and it is required to bond them together.

It may be noted that where the problem is to merely prevent moisture from getting into the product or to prevent gases from the atmosphere from contacting the contents within the container, an external impermeable coating might be satisfactory. However, from the standpoint of the permeation of the liquid with the container outwardly through the container walls, as in the case of a polyethylene bottle, whereas an external impermeable coating might effectively reduce the overall weight loss, the permeation of the contents into the polyethylene bottle wall up to the exterior coating might result in considerable swelling of the polyethylene and a distortion of the bottle shape and strength. Further, with an external coating, in those mixtures where a particular ingredient might be quantitatively small but essential, such ingredient may be lost by absorption in the polyethylene, thereby destroying the desired characteristics of the mixture. This latter situation is especially true for skin lotions, perfumes, etc., in which the oil fraction that governs the perfume odor is small and such fraction would be absorbed in the polyethylene. Accordingly, despite the proportionately greater difficulty of applying an impermeable lining on the bottle interior, the advantages of such an interior lining are great in comparison with an exterior coating which may be more simply applied.

Acknowledging the above set forth problems relating to the production of relatively flexible synthetic resin containers and bottles which are permeable to certain chemicals, it is a primary object of this invention to provide improved method and apparatus for producing a coating adherent surface on the interior of synthetic resin containers and for applying an adherent coating to the interior surface of a container fabricated from a normally hydrophobic synthetic resin.

More particularly, it is an object of this invention to improve on the method and apparatus disclosed in the copending application, Serial No. 534,811, filed Sept. 16, 1955, by Gardner and Nielsen, now U.S. Patent No. 2,892,733.

It is a further object of this invention to provide improved method and apparatus for coating the interior surface of a synthetic resin container which includes improved method and apparatus for introducing an explosive mixture into the synthetic resin container which is to be internally coated and igniting such mixture to produce an oxidized, coating-adherent, surface on the container interior.

The above and more specific objects of the instant invention will be apparent from the description given hereinafter of a specific structure embodying the features of the instant invention and susceptible of operation in accordance with the method of this invention. It will be recognized that the structure as illustrated on the drawings is given merely by way of example to constitute a disclosure of a machine for carrying out the objects of the instant invention.

Figure 1 is a plan view illustrating the general relationship of the parts of the container lining apparatus;

Fig. 2 is a front elevational view of the structure shown in Fig. 1; and

Fig. 3 is an enlarged elevational view, partly schematic, of the combustible nozzle and ignition units shown in Fig. 2 at a first treatment station.

Referring more particularly to Figs. 1 and 2 of the drawings, there is shown thereon, somewhat diagrammatically, a continuous conveyor system including a rectangular frame 10 mounted on suitable legs 11. Frame 10 has an upwardly opening slot 12 in which is mounted an endless conveyor chain 13. This chain is constructed to carry a plurality of upwardly extending container supports 14, which are disposed at regularly spaced intervals along the length of the chain 13 and serve to transport the containers to be lined by the apparatus successively through a plurality of treatment stations or chambers. In loading and unloading the container supports 14 the operator will be positioned adjacent the right end of frame 10, as shown in Figs. 1 and 2, and place the containers to be lined on the supports 14 as they are moved along by chain 13. Similarly, the containers, subsequent to their being lined, will be removed from the supports 14 as they approach the loading station.

The chain 13 is driven by a suitable electric motor 15 through a shaft 16 which is suitably coupled to drive the chain 13 carried in the slot 12 of frame 10. The motor 15 also drives through shaft 17 a series of device actuating shafts 18, 19 and 20 which are operable, as will be described hereinafter, to actuate certain devices positioned at the treatment stations located along the path of movement of chain 13. Shaft 17 further extends across to drive a timer 25 which, as will be described, is employed to synchronize actuation of devices at the first treatment station in accordance with the speed of movement of the containers to be treated through such station.

The principal treatment stations disposed along the path of movement of chain 13 include a surface oxidizing station A for treating the interior walls of the containers to be coated to make them receptive to the coating material to be applied thereto, a spray coating station B wherein the particular coating material is sprayed onto the interior of the containers which have been treated at station A and a curing and/or drying station C wherein the containers are subjected to an elevated temperature to drive off the volatile constituents of the coating material and/or cure the coating to form a lining on the bottle interior. Intermediate the outlet of station B and inlet of station C there is positioned a perforated conduit 30 connected by means of a pipe 31 to a suitable source of air pressure (not shown). Conduit 30 is mounted on supports 32 directly above the path of movement of chain 13 with the perforation of such conduit facing downwardly to direct streams of air down into the containers as they move from the coating station B. This blast of air serves as a preliminary means of driving off volatile constituents of the coating material prior to the introduction of the coated containers into the final drying and curing oven positioned at treatment station C.

Reference will now be had to the construction and function of the surface oxidizing treatment station A. At this station there is mounted a unit 35 which functions to impart appropriate reciprocating and lateral movement to the devices which cooperate with the containers to be treated as they move through the station. In other words as the continuously driven chain 13 carries the container supports 14 through the station, the devices for introducing an explosive mixture and igniting such mixture within the containers will partake of a movement corresponding to the speed of movement of the containers through the station and be moved into and out of cooperation with the containers as the machine operates.

Unit 35 includes a housing 36 mounted on frame 10 and providing a track 37. A carriage 38 engages track 37 so as to be laterally movable in a path generally parallel to the path of movement of the container supports 14 through station A. The carriage 38 is caused to move along with the progress of movement of container supports 14 by detents (not shown) engaging the base of the container supports to carry the carriage along its track 37 and be disengaged from the container supports upon reaching the end of its path of movement. A suitable spring or other carriage return mechanism (not shown) is provided to return the carriage and position the detents for engagement with the next succeeding container support to move through the treatment station. To move the container treating devices into and out of engagement with the containers being treated as they move through the station, carriage 38 is provided with an upwardly extending column 39 which guides vertical reciprocating movement of a support rod 40. Rod 40 is vertically reciprocated by suitable linkage (not shown) which is coordinated with and may if desired be operated by the movement of the container supports 14. It will be understood, however, that the vertical movement of the rod 40 may be otherwise suitably effected as by a drive connection 41 from the drive shaft 18.

The specific details of construction and operation of carriage 38 in imparting reciprocating and lateral movement to support rod 40 have not been shown on the drawing since such features form no part of the instant invention and are already known in the art. By way of illustration, Paasche Patent 2,547,884, issued April 3, 1951, discloses, a suitable structure which may be used to impart reciprocating and lateral movement to devices which are to cooperate with the containers as they are continuously moved through a treatment station.

As shown diagrammatically on Fig. 1, a device 45 for rotating the container supports 14 may be mounted behind unit 35. This device includes an endless belt 46 which is driven by pulleys 47 and 48 with one run of the belt positioned to engage with pulleys 49 (see Fig. 3) mounted at the lower end of container supports 14. Belt 46 serves to impart rotation to the container supports 14 as they move through treatment station A and therefore promote the oxidation or other modification of the interior walls of the container as will be explained in more detail hereinafter. As in the case of unit 35 the specific details of device 45 have not been shown on the drawings. For a description and illustration of such specific details, reference may be had to the hereinabove mentioned Paasche Patent 2,547,884.

Fig. 3 illustrates the devices carried by and movable with carriage 38 of unit 35 which cooperate with the containers to be treated as they continuously move through the treating station. As shown on this figure, containers in the form of bottles D are mounted in the pockets provided by container supports 14.

As shown in Fig. 3, support rod 40 mentioned hereinabove reciprocates relative to column 39 and also partakes of lateral movement along with carriage 38 which carries such column. The upper end of rod 40 has a clamp 80 secured thereon which carries a horizontally extending rod 81. A clamp 82 is fastened on the outer end of rod 81 and carries a crossbar 83 which in turn supports at its opposite end an angle 84. Clamps 86a and 86b are mounted at the lower end of the angle rod 84 to provide individual supports for nozzle and ignition assemblies 87 and 88, respectively.

The details of construction of each nozzle and ignition assemblies 87 and 88 are shown in Fig. 3. It will be seen that the nozzle assembly 87 includes a conventional oxyacetylene welding torch 87a having an interior chamber into which is introduced a combustible gas through a tube 89 and a combustion supporting gas through a tube 90. A torch tip 91 extends downwardly from the torch 87a and discharges at a point adjacent the bottom of the bottle D in a holder 14 positioned thereneath.

Obviously, if desired, the invention may be carried out by treating only a single container for each pass of carriage 38 or by providing the requisite additional parts, more than two containers may be simultaneously treated.

It will be seen from the description of the nozzle and ignition assemblies 87 and 88 as given hereinabove that the combustible gas and combustion supporting gas introduced through tubes 89 and 90 mixes in the torch 87a to form the explosive mixture to be introduced into the container. The gas mixture flows downwardly and out through the sole opening in the bottom tip 91 of the nozzle. The brackets and rods which are mounted on support rod 40 enable positioning of the assemblies 87 and 88 so that downward reciprocation of rod 40 will result in each assembly being inserted into a container D positioned beneath the particular device.

As illustrated on the specific structural embodiment shown in Figs. 1 and 2, an enclosure booth 100 is provided having one side thereof open to permit access to adjust and repair the mechanisms mounted at surface oxidizing station A. Further, as shown, booth 100 is provided with a stack 101 which has mounted therein a motor driven fan unit 102 to withdraw air from the booth during operation of the apparatus.

A platform 103 is shown secured on the side wall of booth 100 to provide a mounting for the gas pressure regulating units 89a, 90a, 89b, 90b, which control measuring and admitting of gases to the nozzle assembly 87, and also mount the other control elements for treatment station A.

Considering the gas metering units, the inlet for the two pressure and flow regulating units 89b and 90b are connected respectively to a combustible gas supply, such as propane and to a combustion supporting gas, such as oxygen.

The ignition assembly includes an electrode 94 which is secured in the clamp 86b and the tip 96 of which creates a spark gap 95 with a ground wire 97 secured by the ignition assembly clamp 86b.

The ignition electrode 94 is connected to the high voltage output of a transformer 98, the current to which is supplied by a microswitch 99 that is triggered and momentarily closed by the forward motion of the carriage 38.

Preferably as shown in Fig. 3, the tip of the ground wire 97 is hook-shaped and curved upwardly to form, the spark gap with the electrode tip 96 so as to avoid Jacob's ladder effect. The electrode 88 is adjusted so that the spark gap is at or only slightly below the lower end of the neck of the bottle D rather than at or near the bottom of the bottle where the explosion might drive a portion of the combustible gases from the bottle before completion of the explosion.

The welding torch 87a mixes the gases supplied by the lines 89 and 90 and introduces the gas mixture into the bottle D through the torch tip 91 preferably when the tip is at or adjacent the bottom of the bottle so that most of the air is purged out of the bottle. The volume of the gas mixture is controlled by opening and closing individual solenoid valves 89a and 90a in the gas and oxygen lines 89 and 90, respectively, responsive to the timer 25. Normally the valves 89a and 90a are opened and closed simultaneously by the timer, the period of which is adjustable in order to control the quantity of gases introduced into the bottle.

Adjustable pressure and flow regulators 89b and 90b and surge tanks and gages 89c and 90c are provided to regulate and control the ratio of the two gases. One part propane and three parts oxygen is a suitable gas mixture although other gases and proportions may be used.

While only one nozzle assembly 87 and one ignition assembly 88 is illustrated, additional pairs of course may be provided in various arrangements and combinations so that a plurality of bottles are filled with an explosive mixture concurrently and are exploded concurrently.

When the equipment is in automatic operation, the bottles are filled with the explosive gas mixture at a first station and then moved under the spark electrodes and exploded at another station.

As shown in Fig. 3, the ignition transformer 98 is connected to the electrode 94 of assembly 88 so that upon appropriately timed energization of the transformer a charge will be applied between the electrode tip 96 and ground wire 97 of each assembly resulting in a spark being produced to ignite the explosive mixture introduced into the container being treated.

Reference will now be had to timer 25 which as mentioned hereinabove is driven along with the rest of the apparatus by motor 15 so that operation of the timer will be synchronized with operation of the other machine elements. Timer 25 may be of any suitable well known design and the details of its internal construction have not been specifically illustrated on the drawings. Such timer includes a series of switches which are intermittently opened and closed in synchronization with the speed of operation of the apparatus to appropriately energize the solenoids 89a and 90a for admitting the explosive mixture into the containers at the proper time as the containers pass through treatment station A. Merely by way of example, the timer 25 may take the form of a rotating shaft driven at a speed proportional to the rotation of shaft 17 and carrying thereon cams positioned to actuate individual switches for making and breaking the circuits in effecting the desired control operation. The control wires leading from timer 25 are shown enclosed in a conduit 126 and connected to the solenoid valves 89a and 90a.

Reference will now be had to the operation and functioning of the parts at treatment station A. As the chain 13, driven by motor 15, carries the bottles D to be treated on supports 14 through treatment station A, carriage 38 moves back and forth and support rod 40 reciprocates in synchronization with the movement of bottles D through the station. In each cycle of operation of carriage 38, rod 40 which carries the nozzle and ignition assemblies 87 and 88 moves to insert the assemblies into the bottles D, move them along with such containers for a part of their path of travel through the station and then remove the assemblies and return them laterally to be inserted into a subsequent pair of containers, the second of which was the first in the preceding pair.

The proper proportions of the combustible gas and the combustion supporting gas which make up the explosive mixture are obtained by adjusting the regulators 89b and 90b so that the identical valves 89a and 90a admit the gases in the desired ratio when concurrently opened by the timer 25.

After a bottle has been filled with combustibles by the nozzle assembly 87, the filled bottle is moved to the ignition assembly 88 which thereupon is lowered and the transformer 98 energized to produce a spark across the gap 95 between the tip 96 and ground wire 97 and expose the combustibles.

It is to be noted that as used herein, the term exploding embraces detonation and deflagration of the explosive mixture introduced into the container to be treated. The explosion products sweep the interior of the bottles for more effective surface treatment. Upon completion of the pass of carriage 38 along with the containers moving through treating station A and during which pass the interior walls of the container is oxidized or otherwise modified by the explosive treatment, the support rod 40 raises the nozzle and ignition assemblies 87 and 88 out of the containers and the return movement of carriage 38 carries the parts back to pick up and treat the next succeeding pair of containers.

The bottles D carried by supports 14 move out of treatment station A where the interior walls thereof have been oxidized and into treatment station B. Station B includes a water wash booth 130 having a stack 131 with a fan unit 132 for drawing air from and through the booth. A water pump 133 driven by a motor 134 provides a wash water supply through which the atmosphere is drawn to filter out the overspray of coating particles produced by the spray apparatus mounted within the booth 130.

A pair of units 135 and 136 are mounted immediately adjacent the path of movement of bottles D through the treatment station. These units may take the form of construction as described in connection with unit 35 associated with treatment station A. More specific details of the operation and functioning of these units may be found in the disclosure of Paasche Patent 2,547,884. Suffice it to state that each unit is mounted to be operable in conformity with the speed of movement of the containers to be coated through the treatment station so that the spray nozzles carried by such units will be moved down into the containers and along with the course of movement of such containers during the spraying action and raised from the containers immediately prior to the return movement of the carriage on which they are carried for cooperation with the next containers to be coated.

Each unit 135 and 136 carries one or more spray nozzles 140 which are positioned on the respective units at appropriate spacing to cooperate with containers to be coated so that upon each actuation of the particular unit one or more containers will be coated by the spray nozzles. In addition to Paasche Patent 2,547,884, reference may be had to Paasche Patent 2,059,706 for more specific details as to the construction and operation of spray nozzles 140. The spray nozzles 140 on unit 135 are connected to a pressurized coating material supply tank 141 and spray nozzles 140 on unit 136 connected to a suitable pressurized coating material supply tank 142. The construction and operation of such supply tanks for feeding a coating material to spraying devices is old and well known and, accordingly, the details of construction of such apparatus are not shown on the drawings. By way of illustration of such an apparatus associated with an automatic coating machine, reference may be had to Paasche Patent 2,069,844.

To effect rotation of the containers as they pass through treatment station A, and while the interior of the containers are being sprayed, there is provided a drive unit 145 positioned adjacent unit 135 and a drive unit 146 positioned adjacent unit 136. These drive units may be similar in construction to the unit 45 described hereinabove and may take the form of such units as described in Paasche Patent 2,547,884. As in the case of unit 45, drive units 145 and 146 rotate the supports 14 and thereby the containers mounted thereon to result in more effective coating of the entire interior of the containers.

In the specific structure illustrated, the two units 135 and 136, each of which carries at least one nozzle to coat at least one container, are provided to insure effective coating where the container takes the form of a bottle having a non-circular transverse cross section, such as found in an oval bottle. More particularly, in accordance with the present invention, the bottles are rotated in a first direction in the unit 135 and in the opposite direction in unit 136. To insure complete coating of this type of bottle, the spray nozzles of both units 135 and 136 are provided with nozzle orifices directing the spray of coating material laterally so that, as the nozzles are introduced into the bottles and coating material sprayed therefrom, the inner surface of such bottles are thoroughly coated. Thus, by the combined two-step spraying, with the bottles being rotated in a first direction relative to the spray nozzles on unit 135 and in the opposite direction relative to the spray nozzles on unit 136, a complete coating of the bottle interior is achieved.

To time the operation of the spray nozzles 140 so that the coating material is sprayed therefrom at the proper time in synchronization with the course of movement of the containers through the treatment station B, there is provided a timing mechanism, indicated by 147 on Fig. 1, to control spray nozzles 140 on unit 135 and a similar timing mechanism 148 provided to control appropriate operation of the spray nozzles carried on unit 136. The details of construction of these timing mechanisms are not shown or described herein, a suitable mechanism for effecting such timed control being shown and described in Paasche Patent 2,547,884.

After the containers have been coated at treatment station B, they are moved by chain 13 beneath the perforated conduit 30 which, as heretofore described, directs streams of air downwardly into the containers to purge and promote evaporation of the volatile constituents of the coating material. These containers carried on supports 14 proceed along with the movement of chain 13 into the treatment station C which includes an oven 150 wherein suitable means are provided to produce the requisite heating temperature to dry the coating material and, if necessary or desirable, to cure it to form it into the desired impermeable lining within the container. As the containers pass out of oven 150 as moved therefrom by chain 13, the operator of the apparatus may remove the containers from the supports and position unlined containers on the supports to be carried through the successive treatment stations for the application thereto of the desired impermeable lining.

It will be readily appreciated that the general method of the invention can be practiced by hand or by any appropriate apparatus other than that shown in the drawings.

Methodwise, the invention generically embraces modifying the interior surface of a container fabricated from natural or synthetic resinous material to render such surface hydrophilic or otherwise receptive or adherent to coating materials, particularly polar compounds or compositions by exploding an explosive material therewithin.

The instant invention embraces the steps of introducing a heavier-than-air explosive mixture into the container to be lined and filling the container with the mixture introduced, exploding the mixture with the electrode thus positioned within the container interior and thereafter applying coating material to such coating adherent surface. In a preferred embodiment of the invention, the coating is applied while the container is rotated in first one direction and then another, or opposite direction, and thereafter the coating dried or cured at an elevated temperature to form that coating into a generally continuous lining on the interior of the container.

It will be readily appreciated that the method of the invention can be practiced by hand or with appropriate apparatus of which that illustrated and hereinbefore described is illustrative.

The invention embraces modifying the interior surface of a container fabricated from natural or synthetic resinous material to render such surface hydrophilic or otherwise receptive or adherent to coating materials, particularly polar compounds or compositions by exploding an explosive material therewithin. The method of the invention is applicable to rigid or flexible containers fabricated from substantially all types of thermoplastic and thermosetting synthetic resins.

The invention finds most significant application when employed to modify the interior surface of a container fabricated from a normally hydrophobic synthetic resinous material to render such surface receptive or capable of forming a strong bond with polar compounds, both monomeric and polymeric, particularly polar film-forming materials and dyes. The interior surface of the container may, in the course of the process, be rendered hydrophilic or pass through a hydrophilic stage and then assume a coating-receptive hydrophobic condition. Typical of such generally hydrophobic resins are polyethylenes, nylons, natural and synthetic rubbers, polystyrene, and various synthetic hydrocarbon polymers including particularly olefin and diolefin polymers and copolymers and the like. The invention is generally applicable to the modification of the interior surfaces of containers manufactured from normally hydrophobic resins of which the foregoing list is illustrative only.

Similarly, substantially any type of combustible composition can be employed. Preferably an explosive mixture of a gaseous fuel, more particularly a gaseous hydrocarbon fuel, with air or other free oxygen supplying gas is employed. Typical gaseous fuels which can be utilized include propane, ethane and natural gas, and the like. A mixture of propane and free oxygen is a species of combustible composition and specifically a mixture of about one part by volume of propane to five parts free oxygen by volume is a preferred explosive mixture. Mixtures of propane and air are a species of explosive composition useful in the invention. Combustible mixtures of liquid fuels or vaporized liquid fuels and air or other free oxygen containing gas can be employed. Representative of such fuels are the combustible hydrocarbons such as gasoline, kerosene, and the like.

The invention is unrestricted with respect to the compound composition or material applied to the interior surfaces of containers which have been modified in accordance therewith. Generally, such materials are applied in the form of solutions, suspensions, dispersions or the like in a liquid medium which can be volatilized. A significant aspect of the invention embraces the application of film-forming materials to the modified interior surfaces of containers. Such film-forming materials, which normally are natural or synthetic resins, are generally embraced by the invention. Reference is made to the list of resinous materials hereinbefore recited as representative of material from which containers can be fabricated for an enumeration of film forming resins which can be employed. The art is well cognizant of the various film forming materials, which are generally contemplated, hence a more exhaustive list is not presented.

Film forming materials, such as those above referred to, are most appropriately employed in conventional form as a solution thereof in volatile solvent media. Coating compositions embracing solutions of film forming resinous materials in volatile solvents are widely known and are generically embraced by the invention.

In the embodiment of the invention which is addressed to the application of a coating to the interior surface of a container fabricated from normally hydrophobic resinous material, which surface has been modified to impart hydrophilic properties thereto, polar coating materials, including polar film forming resinous material are preferred. A commercially significant application of this feature of the invention resides in the application to the modified interior surfaces of containers fabricated from polyethylene, nylon and the like, of a liner or coating which is impermeable to materials with respect to which the unmodified or uncoated resin from which the container is fabricated is permeable. The preferred film forming resins useful for such purposes are polar compositions, which are cured or set, as by the application of heat or on standing, after the coating or liners of such materials have been formed on the modified interior walls of the container. Film forming resinous materials which have been found to be particularly useful for forming such liners include the various epoxy resins, mixtures of vinyl ester-vinyl alcohol copolymers with urea-formaldehyde resins of intermediate stage polyacrylonitrile resins, polyamide resins such as the nylons, acrylonitrile-styrene copolymers and the like. One specific solution of a coating material found effective for use in the invention includes a mixture of vinyl chloride with a commercial ureaformaldehyde resin, the two polymeric materials being dissolved in an amount requisite to provide a solution containing about 20% by weight of solids in a mixture containing substantially equal proportions of toluene and methylethylketone.

Representative non-curing or non-thermosetting resins which can be employed include polyvinyl alcohol, which can be appropriately employed in aqueous solution, for example an aqueous solution containing 10% to 20% by weight of polyvinyl alcohol; aqueous solutions, suitably in like concentration of copolymers normally containing from about 1 to 90% maleic anhydride, solutions of nylons in low molecular weight aliphatic alcohols, such as methyl ethyl and propyl alcohol, in a preferred concentration of about 15 to about 20% by weight of nylon and the like. The particular coating composition which is employed does not constitute an essential aspect of this invention which is generically applicable to the utilization of all such compositions.

The curing of thermosetting type coating compositions can be effected in any desired manner by subjecting the bottles to which the coatings have been applied to an appropriate temperature for a period of time requisite to set the desired adhesive. The conditions requisite to effect setting of the thermosetting type adhesives with which this invention is used are known to the art and need not be here defined. Generally speaking, a temperature from about room temperature to about 200° F. for a time period of from about five minutes to about three hours can be employed.

While this invention has been described particularly with reference to the application of liners to the interior of polyethylene bottles to impart improved resistance to penetration of various materials through the walls of such bottles, it will be appreciated that the invention is applicable for other purposes. For example, in many instances it is desired to apply to the interior of such containers a pigmentation or color. Such an effect can be achieved through the practice of this invention by treating the interior of the bottle walls in the method described followed by application to the so-treated walls of a pigment carrying composition. Similarly, it may be desired to apply materials having various physical or chemical properties to the interior of the container walls. More particularly, it is contemplated to apply to the interior of containers by the method of this invention antioxidant or anticorrosive materials which are effective to maintain or stabilize compositions which are stored within such bottles. Accordingly, the invention is not restricted to the application of liners of film-forming coating materials to the modified interior surfaces of containers.

I claim:

1. Apparatus for treating interior walls of synthetic resin plastic containers comprising a container support, nozzle means having a discharge opening only at the outer end thereof for introducing a heavier-than-air explosive mixture into a container positioned on said support, said nozzle means being mounted to be movable into the container to dispose said discharge opening adjacent the bottom of said container for filling said container with the mixture while the container is supported by the support, ignition means for igniting and exploding the mixture within said container to modify the interior walls of the container carried on said support, and means for spray coating the modified interior walls.

2. Apparatus as recited in claim 1 and wherein said ignition means are located within and adjacent the top of the container to ignite the mixture.

3. Apparatus for treating the interior walls of synthetic resin plastic containers as recited in claim 1, further including drive means engageable with said support to rotate said support and the container carried thereon in first one direction and then the other while spray coating the interior walls of the container.

4. Apparatus for treating the interior walls of synthetic resin plastic containers comprising a support for carrying a container during treatment with the mouth of such container opening upwardly away from said support, nozzle means mounted to be movable downwardly from a first position spaced a predetermined distance above said support and outside a container on said support to a second position adjacent said support and within a container supported on said support to introduce and fill the container with an explosive mixture introduced adjacent the bottom only of the container, ignition means including a spark gap mounted above said support to be insertable within the container and locatable adjacent the mouth of the container to create a spark across said spark gap at the mouth of the container to ignite the explosive mixture in the container.

5. Apparatus for treating the interior walls of synthetic resin plastic containers comprising an endless conveyor carrying a plurality of container supports at spaced positions along the length of said conveyor, a treatment station through which said conveyor extends to transport containers to be lined as mounted on said supports, a unit mounted at said treatment station and having a support member movable laterally for a predetermined distance along with each container as it moves through said station and reciprocable generally normal to the path of movement of said conveyor through said station, drive means connected to said conveyor and said unit to actuate said support member to move in timed relation to the speed of movement of the containers through said station, nozzle means having a discharge opening at the bottom only, said nozzle means being mounted on said support member and positioned directly above the path of movement of said conveyor through said station to be moved downwardly into the container in each of said supports in succession upon reciprocation of said support member to position said discharge opening adjacent the bottom of the container in the aligned support, means coupled to said nozzle means for admitting an explosive mixture to said nozzle means and thence into the container being treated, ignition means for igniting the mixture within the container initially within and adjacent the top of the container.

6. Apparatus for treating the interior walls of containers comprising an endless conveyor carrying a plurality of container supports at spaced positions along the length of said conveyor, a treatment station through which said conveyor extends to transport container to be lined as mounted in said supports, a unit mounted at said treatment station and having a support member movable laterally for a predetermined distance along with each container as it moves through said station and reciprocable generally normal to the path of movement of said conveyor through said station, drive means connected to said conveyor and said unit to actuate said support member to move in timed relation to the speed of movement of the containers through said station, nozzle means mounted on said support member and positioned directly above the path of movement of said conveyor through said station and movable downwardly into the container on each of said supports upon successive reciprocations of said support member, metering means coupled to said nozzle means for admitting an explosive mixture to said nozzle means and thence into the containers being treated adjacent the bottom only thereof, ignition means movable into the top only of the container to explode the mixture within the container by energization of said ignition means within the top of the container, a coating station through which the conveyor carries the treated containers, spray coating nozzle means at the coating station for spraying the interior of the treated container, and means for rotating the container in opposite directions during spraying.

7. A method of modifying the interior walls of synthetic resin containers to render said walls receptive to a polar film coating, comprising the steps of introducing into and filling the container to be treated with a heavier-than-air explosive mixture of gases including a combustible gas and a combustion supporting gas containing oxygen in predetermined proportions such that oxygen is present in the products of combustion of the mixture, said gases being introduced into the upright mixture, said gases being introduced into the upright container only adjacent the bottom of the container, and igniting said explosive gaseous mixture within said container adjacent the top thereof to oxidize the interior container walls and make them adherent to a polar film coating.

8. A method of modifying the interior walls of synthetic resin containers to render said walls receptive to a polar film coating, comprising the steps of introducing into and filling the container to be treated with a heavier-than-air explosive combustible mixture of gases including a combustible gas and a combustion supporting gas containing oxygen in predetermined proportions such that oxygen is present in the products of combustion of the mixture, said gases being introduced into the upright container only adjacent the bottom of the container as the explosive mixture is introduced, and igniting said explosive gaseous mixture within said container to oxidize the interior container walls and make them adherent to a polar film coating.

9. A method of modifying the interior walls of synthetic resin containers to render said walls receptive to a polar film coating, comprising the steps of introducing into and filling the container to be treated with an explosive mixture of gases including a combustible gas and a combustion supporting gas containing oxygen in predetermined proportions such that oxygen is present in the products of combustion of the mixture, and igniting said explosive gaseous mixture within said container adjacent the top thereof to oxidize the interior container walls and make them adherent to a polar film coating.

References Cited in the file of this patent

UNITED STATES PATENTS

| 2,547,884 | Paasche | Apr. 3, 1951 |
| 2,599,644 | Keukens | June 10, 1952 |
| 2,668,134 | Horton | Feb. 2, 1954 |